United States Patent
Ishikawa et al.

(10) Patent No.: US 8,345,927 B2
(45) Date of Patent: Jan. 1, 2013

(54) REGISTRATION PROCESSING APPARATUS, REGISTRATION METHOD, AND STORAGE MEDIUM

(75) Inventors: Ryo Ishikawa, Kawasaki (JP); Katsushi Ikeuchi, Yokohama (JP); Jun Takamatsu, Kizugawa (JP); Takeshi Ohishi, Yokohama (JP); Bo Zheng, Musashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 837 days.

(21) Appl. No.: 12/431,193

(22) Filed: Apr. 28, 2009

(65) Prior Publication Data

US 2009/0285460 A1 Nov. 19, 2009

(30) Foreign Application Priority Data

May 13, 2008 (JP) ................................. 2008-126455

(51) Int. Cl.
*G06K 9/00* (2006.01)
*G09G 5/00* (2006.01)
*A61B 6/00* (2006.01)
(52) U.S. Cl. ............................. 382/106; 345/629; 378/4
(58) Field of Classification Search .................. 382/106, 382/128, 129, 130, 131, 132, 133, 134, 151, 382/294; 378/4, 8, 21–27, 901; 600/425; 700/57, 124; 345/629, 941
See application file for complete search history.

(56) References Cited

U.S. PATENT DOCUMENTS 7,668,697 B2 * 2/2010 Volkov et al. ................. 702/187
7,945,117 B2 * 5/2011 Hermosillo Valadez et al. ............................ 382/294

OTHER PUBLICATIONS

B. Zheng et al., "Adaptively Determining Degrees of Implicit Polynomial Curves and Surfaces", in Y. Yagi et al. (eds.), *ACCV 2007, Part II*, LNCS 4844, pp. 289-300, 2007.
T. Tasdizen et al., "Improving the Stability of Algebraic Curves for Application", *IEEE Transactions on Image Processing*, vol. 9, No. 3, pp. 405-416, Mar. 2000.
A. Helzer et al., "Stable Fitting of 2D Curves and 3D Surfaces by Implicit Polynomials",*IEEE Transactions of Pattern Analysis and Machine Intelligence*, vol. 26, No. 10, pp. 1283-1294, Oct. 2004.
G. Taubin et al., "2D and 3D Object Recognition and Positioning with Algebraic Invariants and Covariants", Chap. 6 of B. Donald et al. (eds.) *Symbolic and Numerical Computation for Artifical Intelligence*, Academic Press, pp. 147-181, 1992.
M. Blane et al., "The 3L Algorithm for Fitting Implicit Polynomial Curves and Surfaces to Data", *IEEE Transactions on Pattern Analysis and Machine Intelligence*, vol. 22, No. 3, pp. 298-313, Mar. 2000.
Y. Iwashita et al., " 2D-3D Registration Using 2D Distance Maps", *Meeting on Image Recognition and Understanding 2005 (MIRU2005)*, Jul. 2005 (in Japanese with English abstract).
U.S. Appl. No. 12/534,412, filed Aug. 3, 2009.

* cited by examiner

*Primary Examiner* — Abolfazl Tabatabai
(74) *Attorney, Agent, or Firm* — Fitzpatrick, Cella, Harper & Scinto

(57) ABSTRACT

A registration processing apparatus generates a polynomial to calculate a value corresponding to a distance from the surface of a target object in a first image, and acquires a plurality of position coordinates on the surface of the target object in a second image. Then the apparatus respectively calculates a value corresponding to the distance from the surface of the target object in the first image using the polynomial, for position coordinates obtained by coordinate conversion of the plurality of position coordinates. The apparatus coordinate-converts the position coordinates of the second image by a coordinate conversion method for the plurality of position coordinates determined based on the calculated values.

15 Claims, 7 Drawing Sheets

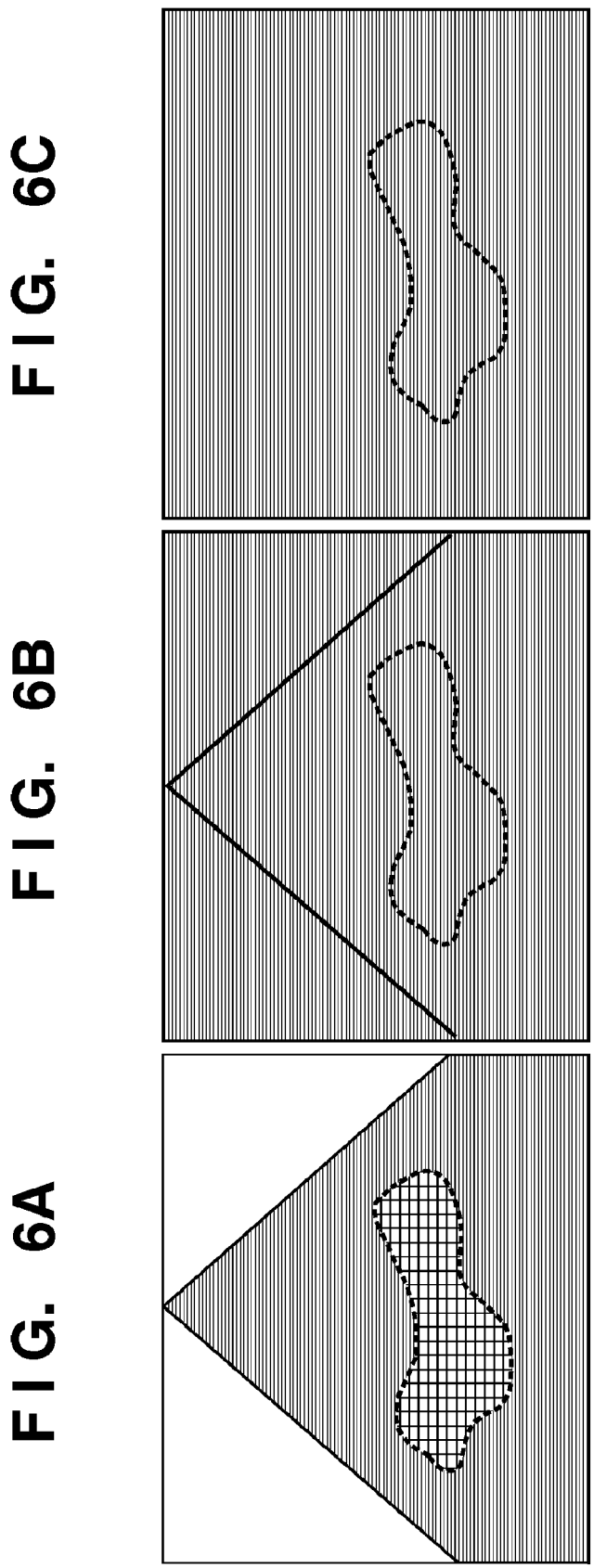

FIG. 7A
610
FIG. 7B
611
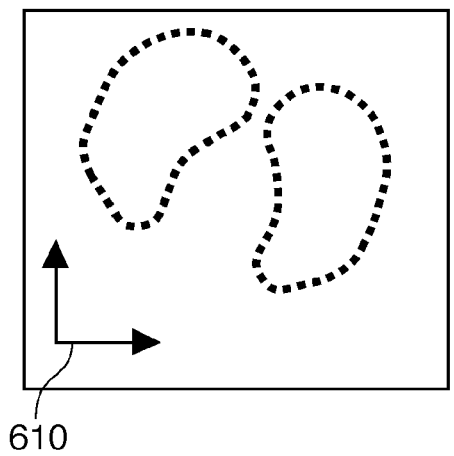
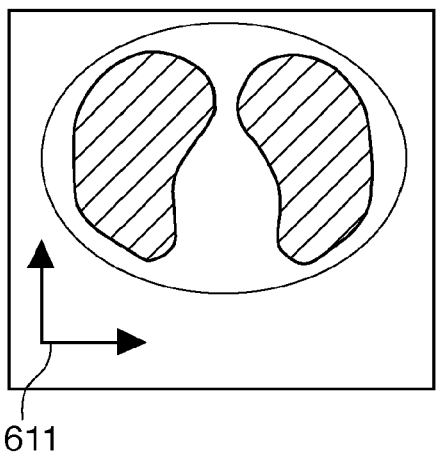
FIG. 7C
FIG. 7D
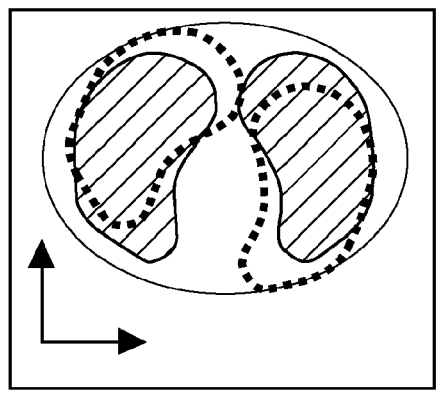
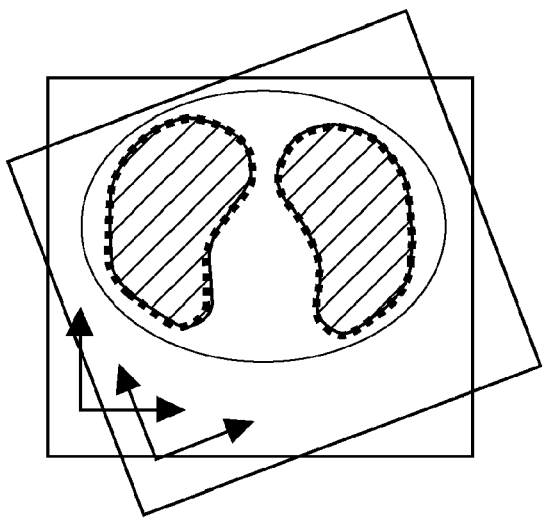

REGISTRATION PROCESSING APPARATUS, REGISTRATION METHOD, AND STORAGE MEDIUM

BACKGROUND OF THE INVENTION

1. Field of the Invention

The present invention relates to a registration processing apparatus, a registration method, a program and a storage medium for performing computer processing on plural image data and performing image registration.

2. Description of the Related Art

In medical fields, a doctor displays a medical image obtained by imaging a patient on a monitor, performs interpretation of the displayed medical image, and thereby observes the status or temporal change of a morbid portion. As an apparatus to generate this type of medical image, a simple X-ray machine, an X-ray computed tomography (X-ray CT) machine, a (nuclear) magnetic resonance imaging (MRI) machine, nuclear medicine diagnostic systems (SPECT, PET and the like), a diagnostic ultrasound (US) system, and the like, can be given.

Further, a diagnosis may be conducted by utilizing plural images obtained from plural apparatuses for the purpose of higher accuracy diagnosis. For example, information useful in diagnosis and medical treatment such as laser radiation can be obtained by imaging one subject using plural imaging apparatuses, and superposing obtained images.

For example, a more accurate position for laser radiation as medical treatment can be obtained by superposing an image obtained from a diagnostic ultrasound system with a three-dimensional image obtained from a CT machine. Accordingly, high accuracy in image superposition is required. However, under the present circumstances, doctors perform image registration between both images by visual observation.

On the other hand, a method for high-speed image registration is studied (Document 1. "2D-3D Registration Using 2D Distance Maps" by Yumi Iwashita, Ryo Kurazume, Kenji Hara, Naoki Aburaya, Masahiko Nakamoto, Kozo Konishi, Makoto Hashizume and Tsutomu Hasegawa, Meeting on Image Recognition and Understanding 2005 (MIRU2005)).

In this method, a relative position between both images is estimated by calculation in the following 1) to 4) until the respective values are converged:
1) to extract a contour line of a two-dimensional image and generate a distance map indicating a value corresponding to a distance from the contour line;
2) to obtain the contour of a silhouette image of a three-dimensional geometric model, and apply a force calculated in correspondence with the distance map to a contour point;
3) to obtain the sum of forces applied to all the contour lines and moment about the center of gravity of the three-dimensional geometric model; and
4) to update the position and attitude of the three-dimensional geometric model in correspondence with the obtained force and moment.

As the technique disclosed in the above Document 1 lacks an idea of indicating a distance map indicating a value corresponding to a distance from a contour line with an expression, it is necessary to store the value indicating the distance map into a memory. Upon calculation of, for example, the force in 3), processing for obtaining coordinates of the silhouette image of the three-dimensional geometric model on the memory corresponding to the contour coordinates is required. Accordingly, it is impossible to obtain a solution of numerical calculation without access to the memory. Further, to realize efficient registration, limitation of memory access disturbs simplification of calculation. This influences registration accuracy.

SUMMARY OF THE INVENTION

The present invention has been made in view of the above problems, and according to its typical embodiment, an apparatus, a method, a program and a storage medium for high accuracy registration among plural images can be provided.

According to one aspect of the present invention, there is provided a registration apparatus comprising: a generation unit adapted to generate a polynomial to calculate a value corresponding to a distance from an area as a target for registration in a first image; an acquisition unit adapted to acquire a plurality of position coordinates from an area as a target for registration in a second image; a calculation unit adapted to respectively calculate a value corresponding to the distance from the area as the target for registration in the first image using the polynomial, for position coordinates obtained by coordinate conversion of the plurality of position coordinates; a determination unit adapted to determine a coordinate conversion method for the plurality of position coordinates based on the values calculated by the calculation unit; and a coordinate conversion unit adapted to coordinate-convert the position coordinates in the second image by the coordinate conversion method determined by the determination unit.

According to one aspect of the present invention, there is provided a registration method comprising: a generation step of generating a polynomial to calculate a value corresponding to a distance from an area as a target for registration in a first image; an acquisition step of acquiring a plurality of position coordinates from an area as a target for registration in a second image; a calculation step of respectively calculating a value corresponding to the distance from the area as the target for registration in the first image using the polynomial, for position coordinates obtained by coordinate conversion of the plurality of position coordinates; a determination step of determining a coordinate conversion method for the plurality of position coordinates based on the values calculated at the calculation step; and a coordinate conversion step of coordinate-converting the position coordinates in the second image by the coordinate conversion method determined at the determination step.

According to still another aspect of the present invention, there is provided an information processing apparatus for registration between a first area and a second area of an image, comprising: a first acquisition unit adapted to obtain a polynomial indicating positional relation of the first area to a reference position; and a second acquisition unit adapted to obtain a correction value for registration between the first area and the second area using position coordinates of the second area and the polynomial.

Further features of the present invention will become apparent from the following description of exemplary embodiments with reference to the attached drawings.

BRIEF DESCRIPTION OF THE DRAWINGS

FIGS. 6A to 6C are explanatory views showing processing in step S305 in FIG. 3 according to the embodiment; and FIGS. 7A to 7D are explanatory views showing registration processing according to the embodiment.

DESCRIPTION OF THE EMBODIMENTS

Figure 1:
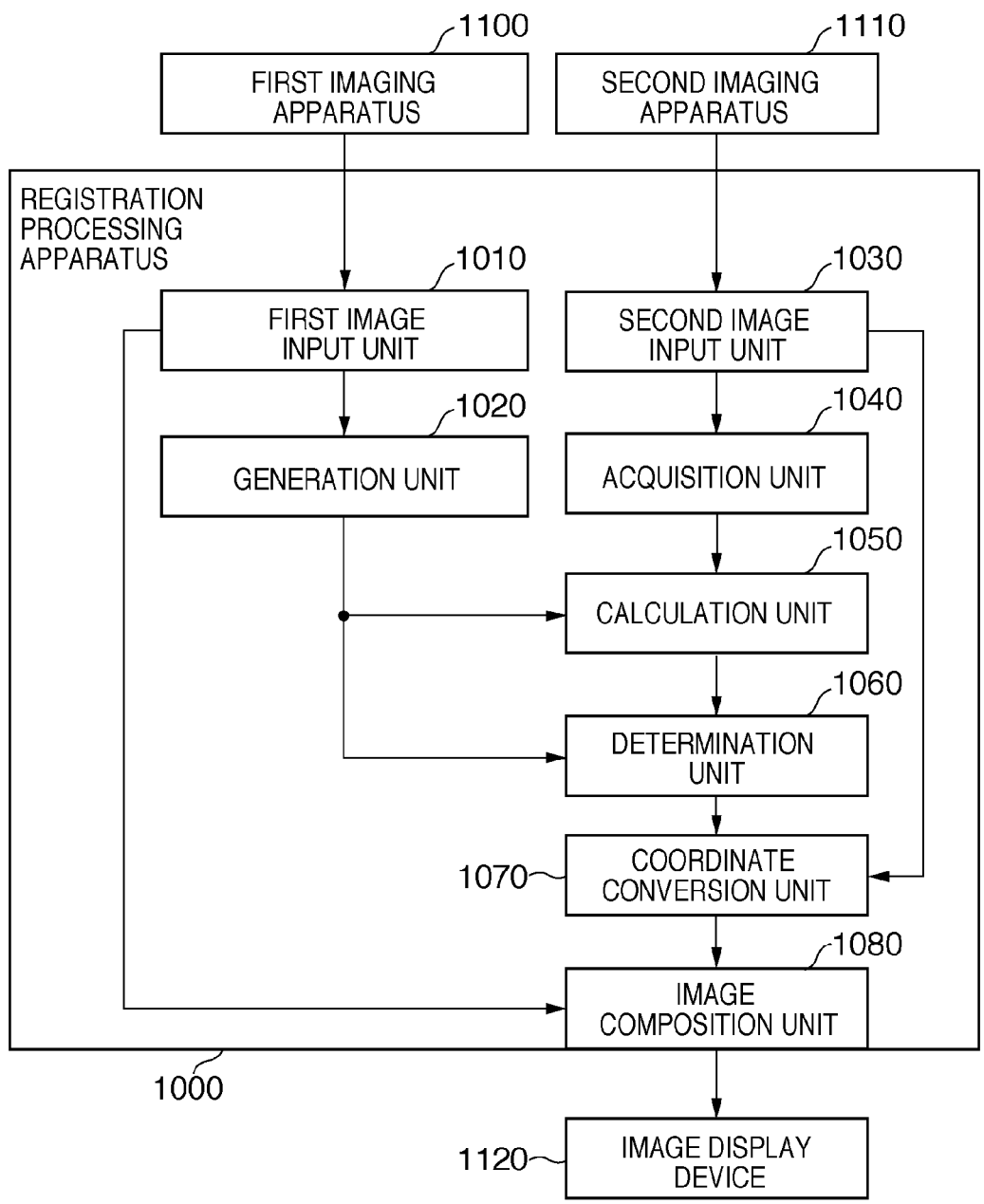
FIG. 1 is a block diagram showing a functional configuration of a registration processing apparatus according to an embodiment.

Hereinbelow, a preferred embodiment of registration processing apparatus and method according to the present invention will be described in detail based on the accompanying drawings. Note that the scope of the invention is not limited to the embodiment illustrated in the drawings.

FIG. 1 shows a functional configuration of a registration processing apparatus 1000 according to the present embodiment. The registration processing apparatus 1000 is connected to a first imaging apparatus 1100 and a second imaging apparatus 1110.

As these imaging apparatuses, a simple X-ray machine, an X-ray computed tomography (X-ray CT) machine, a magnetic resonance imaging (MRI) machine, nuclear medicine diagnostic systems (SPECT, PET and the like), a diagnostic ultrasound (US) system, and the like, can be given. Further, the present invention is also applicable to images obtained by a general camera in addition to medical images.

A first image input unit 1010 inputs an image of an imaging target object obtained by the first imaging apparatus 1100 as a first image.

A generation unit 1020 processes the input first image, obtains plural position coordinates from a registration target area, and generates a polynomial based on the plural position coordinates. The registration target area is an area of interest corresponding to, for example, an internal organ of a human body such as a lung, a stomach, a heart, or the like, a head, a hand, or the like, in the case of, for example, a medical image. In a general camera image, the registration target area corresponds to a person's face or the like. A distance from the registration target area means, in the case of, for example, a lung, a distance from a boundary area between the lung and other internal organs. That is, the distance means a distance from an external surface three-dimensionally constructing the registration target area.

Further, in a two-dimensional image, the distance from a registration target area means a distance from a contour line as a boundary line between the registration target area and the external area.

A second image input unit 1030 inputs an image of the imaging target object obtained by the second imaging apparatus 1110 as a second image.

An acquisition unit 1040 acquires plural position coordinates from a registration target area in the second image.

Note that in the present embodiment, a three-dimensional image is represented as $I_{3D}(x,y,z)$. $I_{3D}(x,y,z)$ is representation of a pixel value of the three-dimensional image in three-dimensional space position coordinates $(x,y,z)$. In the case of a two-dimensional image, representation is made on the presumption that $Z=0$ holds. Further, the physical meaning of this pixel value differs by imaging apparatus. Further, the representation is made by using an orthogonal coordinate system, however, the coordinate system is not limited to the orthogonal coordinate system but a polar coordinate system or the like may be used.

For example, a simple X-ray machine emits an X-ray to a human body and records its transmitted X-ray, thereby obtains a parallel projection image of X-ray absorptance inside the human body. That is, information on X-ray absorptance is a pixel value.

Further, an X-ray CT machine emits an X-ray to a human body from various directions to obtain many perspectives, and analyzes those perspectives, thereby obtaining three-dimensional information of the inside of the human body. This three-dimensional information is called voxel data in CT imaging. That is, in an image obtained from X-ray CT, information on a voxel value is a pixel value.

Further, an MRI machine obtains three-dimensional information inside a human body as in the case of the CT machine. However, as the MRI machine performs imaging by utilizing a magnetic resonance phenomenon, physical information different from that by the CT machine which performs imaging of X-ray absorption is obtained.

Further, a diagnostic ultrasound system emits an ultrasonic wave to a human body and detects the ultrasonic wave reflected from inside the human body, thereby obtaining information on the inside of the human body. Generally, the diagnostic ultrasound system obtains a tomographic image of the human body by a B-mode method. The diagnostic ultrasound system has a characteristic feature that it has no invasion into the human body such as exposure to X-ray radiation and it can simultaneously perform imaging and observation.

As described above, information having a meaning which differs by imaging apparatus is obtained as a pixel value.

Regarding position coordinates obtained by coordinate conversion of the plural position coordinates obtained from the second image, a calculation unit 1050 respectively calculates a value corresponding to a distance from a registration target area in the first image, using the polynomial generated by the generation unit 1020.

A determination unit 1060 determines a coordinate conversion method for the plural position coordinates based on the values calculated by the calculation unit 1050. The coordinate conversion method will be described later.

A coordinate conversion unit 1070 coordinate-converts the position coordinates of the second image by the coordinate conversion method determined by the determination unit 1060.

Further, an image composition unit 1080 generates a composite image with the first image and the coordinate-converted second image, and outputs the composite image to an image display device 1120. The image display device 1120 displays the input image.

Figure 2:
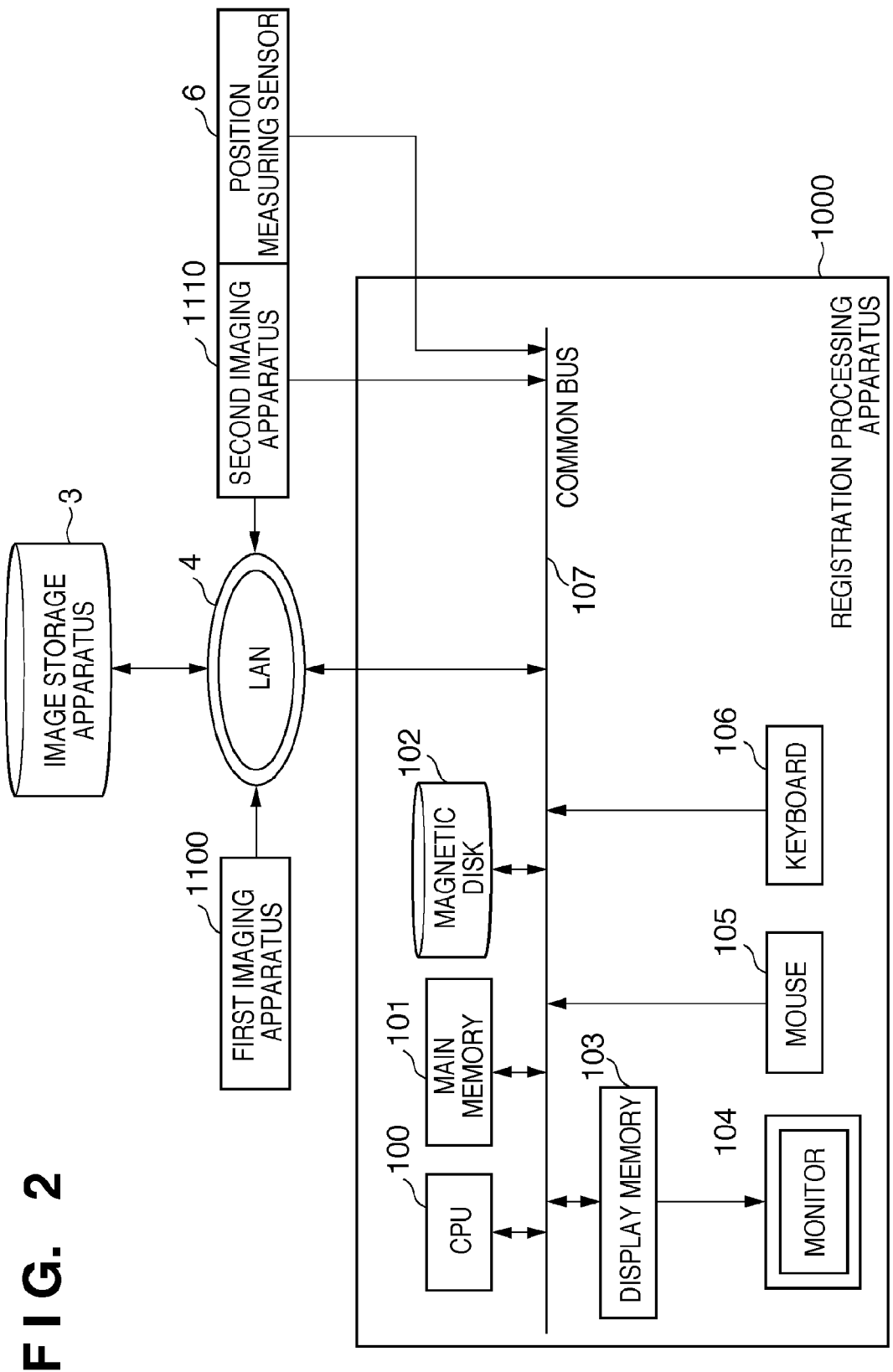
FIG. 2 is a block diagram showing an apparatus configuration of a registration processing system according to the embodiment.

FIG. 2 shows an apparatus configuration of a system using the registration processing apparatus 1000 according to the embodiment. The registration processing system in the present embodiment has the registration processing apparatus 1000, the first imaging apparatus 1100, an image storage apparatus 3, a local area network (LAN) 4, the second imaging apparatus 1110, and a position measuring sensor 6.

The registration processing apparatus 1000 can be realized with, for example, a personal computer (PC). That is, the registration processing apparatus 1000 has a central processing unit (CPU) 100, a main memory 101, a magnetic disk 102, a display memory 103, a monitor 104, a mouse 105, and a keyboard 106.

The CPU 100 mainly controls operations of the respective constituent elements of the registration processing apparatus 1000. The main memory 101 holds a control program executed by the CPU 100 or provides a work area upon program execution by the CPU 100. The magnetic disk 102 holds various application software including an operating system (OS), device drivers for peripheral devices and a program for registration processing to be described later. The display memory 103 temporarily holds display data for the monitor 104. The monitor 104, which is a CRT monitor, a liquid crystal monitor or the like, displays an image based on data from the display memory 103. The display memory 103 and the monitor 104 construct a display unit. The mouse 105 and the keyboard 106 are respectively used for pointing input and character input by a user. The above-described constituent elements are mutually communicably connected via a common bus 107.

In the present embodiment, the registration processing apparatus 1000 reads three-dimensional image data and the like from the image storage apparatus 3 via the LAN 4. Further, the registration processing apparatus 1000 may obtain a three-dimensional image or a two-dimensional image directly from the first imaging apparatus 1100 via the LAN 4. Note that the embodiment of the present invention is not limited to these arrangements. It may be arranged such that the registration processing apparatus 1000 is connected to a storage device such as an FDD, a CD-RW drive, an MO drive or a ZIP drive, and image data and the like are read from the drive. Further, as the first imaging apparatus 1100 and the second imaging apparatus 1110, an X-ray CT machine, an MRI machine, a diagnostic ultrasound system, a nuclear medicine system, a general digital camera, and the like, can be given.

Further, the registration processing apparatus 1000, connected to the second imaging apparatus 1110, can input an image obtained by imaging. In the present embodiment, the second imaging apparatus 1110 is a diagnostic ultrasound system.

The registration processing apparatus 1000 and the second imaging apparatus 1110 may be directly interconnected or may be interconnected via the LAN 4. Further, it may be arranged such that the second imaging apparatus 1110 stores an image in the image storage apparatus 3, and the registration processing apparatus 1000 reads the image from the image storage apparatus 3.

Note that the image represented as $I_{3D}(x,y,z)$ is processed as image data in the apparatus, and displayed as a visible image in a display by the display unit. Accordingly, in the present embodiment, the image data represented as $I_{3D}(x,y,z)$ is called image data or an image.

The position measuring sensor 6, attached to an imaging probe (not shown) of the second imaging apparatus 1110, measures the position, attitude and the like of the probe. Further, the relation between the position measuring sensor 6 and the imaging range of the second imaging apparatus 1110, and the relation between the position measuring sensor 6 and a three-dimensional image are previously calibrated. The registration processing apparatus 1000 reads an output signal from the position measuring sensor 6 as a measurement result, thereby obtains the imaging range of the second imaging apparatus 1110 with approximately proper accuracy in a coordinate system on the basis of a first image.

Figure 3:
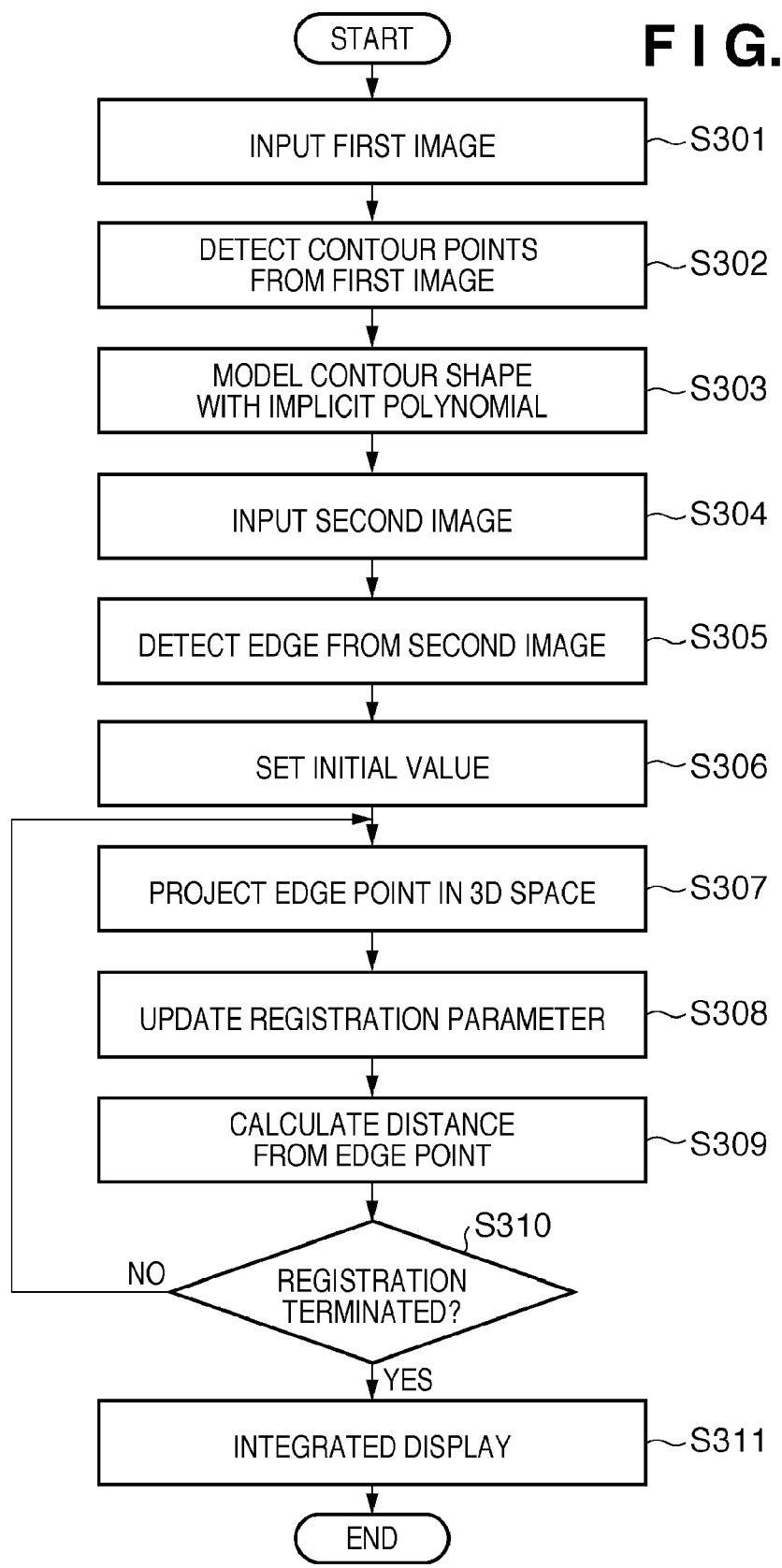
FIG. 3 is a flowchart showing a processing procedure by the registration processing apparatus according to the embodiment.

Next, the operation of the registration processing apparatus 1000 will be described using the flowchart of FIG. 3.

In step S301, the first image input unit 1010 inputs three-dimensional image data or two-dimensional image data of an imaging target object, obtained by imaging by the first imaging apparatus 1100, as a first image. Note that the first image may be directly input from the first imaging apparatus 1100 to the registration processing apparatus 1000. Otherwise, it may be arranged such that the image obtained by the imaging by the first imaging apparatus 1100 is stored in the image storage apparatus 3 shown in FIG. 2, and the first image input unit 1010 reads and inputs desired three-dimensional image data from the image storage apparatus 3. The communication among these apparatuses can be performed via, for example, the LAN 4 as shown in FIG. 2, and as a communication protocol at that time, a DICOM (Digital Imaging Communication in Medicine) format can be utilized.

The input three-dimensional image $I_{3D}(x,y,z)$ is transmitted to the generation unit 1020.

In step S302, the generation unit 1020 extracts contour points of a registration target area from the three-dimensional image input in step S301. The registration target area means an area of interest corresponding to, for example, in the case of a medical image, a portion such as a lung, a stomach, a heart, a head, or a hand.

This processing will be described using FIGS. 4A and 4B. FIG. 4A schematically illustrates the three-dimensional tomographic image (first image) input in step S301 as a two-dimensional image.

In the present embodiment, a three-dimensional image is handled, however, the present invention is similarly applicable to a two-dimensional image.

Figure 4B:
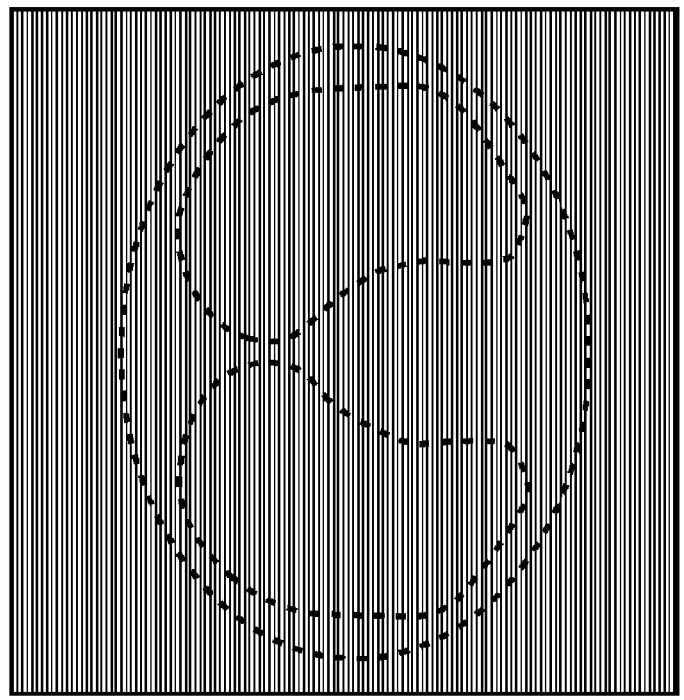
FIGS. 4A and 4B are explanatory views showing processing in step S302 in FIG. 3 according to the embodiment.
Figure 4A:
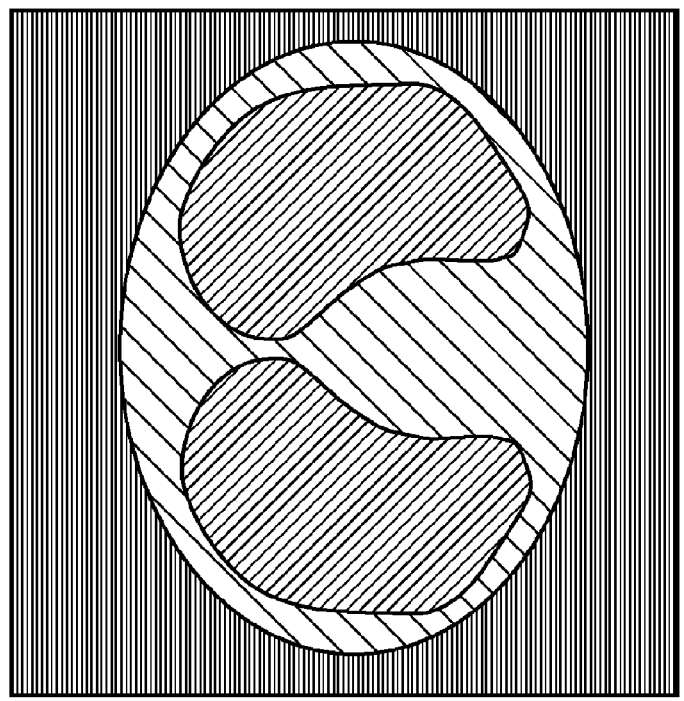

FIG. 4B illustrates an image where the result of detection of the contour points of the registration target area from the image in FIG. 4A. The contour point detection can be performed by various methods. For example, the contour points detection can be realized by obtaining spatial gradient of pixel values of the three-dimensional image, and performing threshold processing with respect to the degree of the spatial pixel gradient.

The method for contour point detection from a three-dimensional image is not necessarily automatic processing. For example, it may be arranged such that the user manually inputs the contour using inputs from the mouse 105 and/or the keyboard 106. Further, it may be arranged such that contour points used in subsequent processing can be selected based on the user's designation from automatically extracted plural contour points.

In the present embodiment, by the processing in step S302, N contour points are extracted from the surface shape of the three-dimensional image, and the position coordinates are represented as a vector $x_{3di} = (x_{3di}, y_{3di}, z_{3di})^T$, $1 \leq i \leq N$.

In step S303, the generation unit 1020 applies an implicit polynomial (IP) to the contour points $x_{3di}$ extracted in step S302. Then the shape of the registration target area is represented with the implicit polynomial.

The implicit polynomial is an implicit function defined in the form of polynomial. More particularly, approximation is made such that the value of the IP of the outer surface of the registration target area extracted in step S302 indicates a zero equivalent plane. By this calculation, a value corresponding to a distance from the registration target area is calculated. The distribution of the values corresponding to distances from the registration target area may be referred to as a distance map.

Further, processing of obtaining a coefficient of a polynomial representing an implicit function may be called modeling of a target object.

Figure 5:
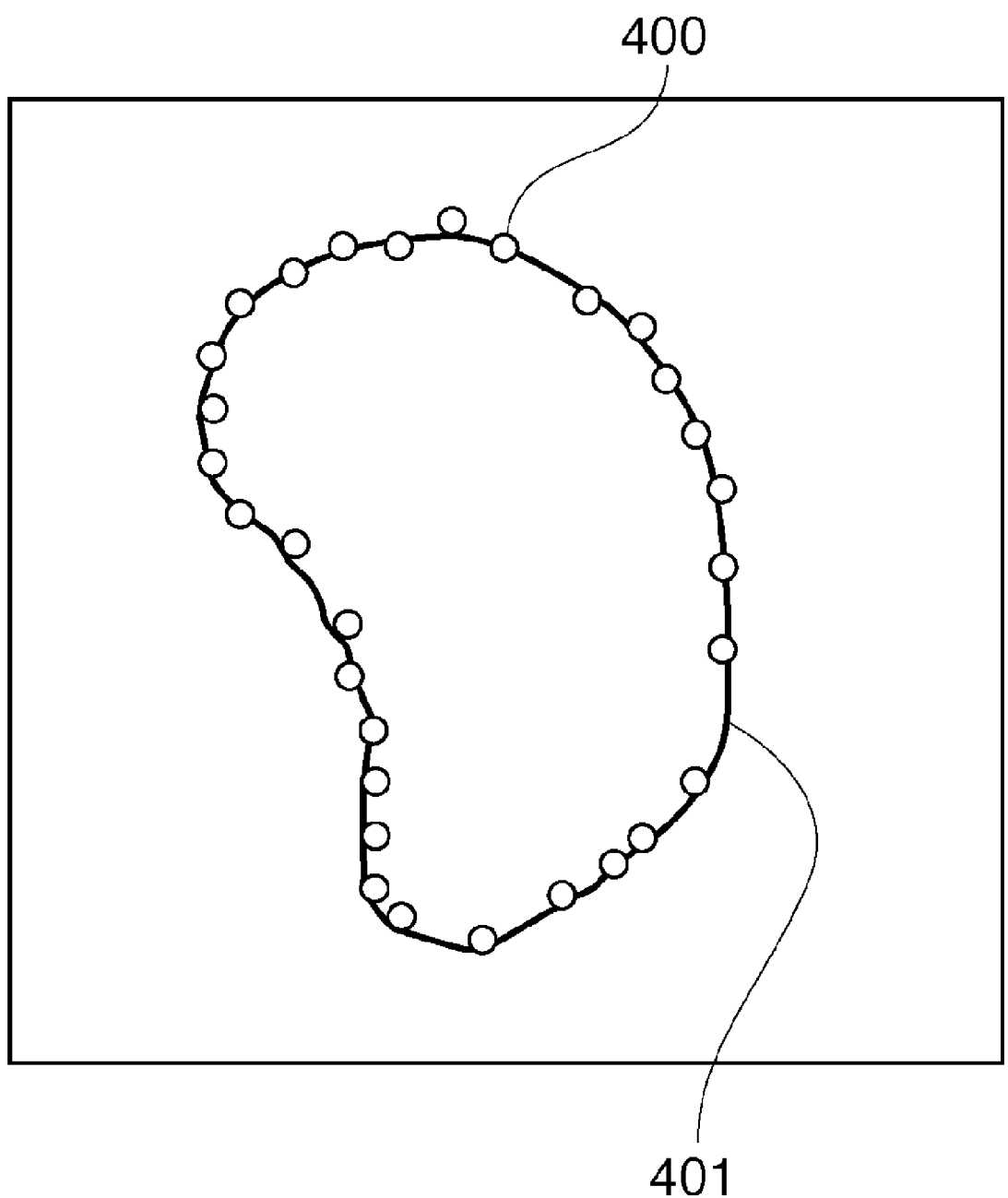
FIG. 5 is an explanatory view showing processing in step S303 in FIG. 3 according to the embodiment.

This processing will be described using FIG. 5. In FIG. 5, a contour point 400 is the contour point obtained in step S302, and an IP zero equivalent plane 401 is a zero equivalent plane of the implicit function obtained at this step. The implicit function to be obtained $\Psi_{3D}(x)$ satisfies the following constraint in positions of these points.

$$\Psi_{3D}(x)=0 \quad (1)$$

Note that the vector $x_{3di}$ is a position coordinate vector $(x_{3di}, y_{3di}, z_{3di})^T$ of the i-th contour point among the plural contour points obtained in step S302.

On the other hand, to represent the implicit function $\Psi_{3D}(x)$ as an implicit polynomial, the implicit polynomial is formulated as follows.

$$\Psi_{3D}^n(x) = \sum_{0 \leq j,k,l; j+k+l \leq n} a_{jkl} x^j y^k z^l = \quad (2)$$

$$(a_{000} \quad a_{100} \quad \ldots \quad a_{00n})(1 \quad x \quad \ldots \quad z^n)^T = 0$$

Note that n is a degree of the polynomial. For example, when n=3 holds, $$\Psi_{3D}^n(x) = a_{000} + a_{100}x + a_{010}y + a_{001}z + a_{110}xy + a_{101}xz + a_{011}yz + \quad (3)$$
$$a_{200}x^2 + a_{020}y^2 + a_{002}z^2 + a_{210}x^2y + a_{201}x^2z + a_{120}xy^2 +$$
$$a_{021}y^2z + a_{102}xz^2 + a_{012}yz^2 + a_{111}xyz + a_{300}x^3 + a_{030}y^3 +$$
$$a_{003}z^3$$
$$= 0$$

When the first term and the second term in the right side of the Expression 2 are respectively represented as horizontal vector $a^T$ and vertical vector $m(x)$, the expression can be rewritten as follows.

$$\Psi_{3D}^n(x) = a^T m(x) \quad (4)$$
$$= m(x)^T a = 0$$

Further, in the implicit polynomial $\Psi^n_{3D}(x)$, as the Expression 4 can be established in all the positions of the N contour points, by defining a matrix $M=(m(x_{3d0})m(x_{3d1}) \ldots m(x_{3dN}))^T$ connecting all the contour points, the following expression can be obtained.

$$Ma=0 \quad (5)$$

Note that 0 is an N-dimensional vector in which all the elements are 0.

Since obtaining a directly from the expression 5 causes instability of the solution, a stable solution with several constraints is disclosed in:

Document 2. Michael M. Blane, Zhibin Lei, Hakance ivi, and David B. Cooper, "The 3L Algorithm for Fitting Implicit Polynomial Curves and Surfaces to Data," IEEE Transactions on Pattern Analysis and Machine Intelligence, Vol. 22, No. 3, pp. 298-313, 2000, Document 3. Tolga Tasdizen, Jean-Philippe Tarel, David B. Cooper, "Improving the Stability of Algebraic Curves for Applications," IEEE Transactions on Image Processing, Vol. 9, No. 3, pp. 405-416, 2000, Document 4. Amir Helzer, Meir Barzohar, and David Malah, "Stable Fitting of 2D Curves and 3D Surfaces by Implicit Polynomials," IEEE Transactions on Pattern Analysis and Machine Intelligence, Vol. 26, No. 10, pp. 1283-1294, 2004.

In the present embodiment, the solution can be realized by utilizing these techniques.

Further, it is necessary to appropriately select the degree n in correspondence with the complexity of the surface shape of the imaging target object to be represented. For example, a technique of adaptively obtaining the degree n with respect to the shape of an imaging target object is disclosed in Document 5. Bo Zheng, Jun Takamatsu, and Katsushi Ikeuchi, "Adaptively Determining Degrees of Implicit Polynomial Curves and Surfaces," Proc. 8th Asian Conference on Computer Vision, 2007.

Further, previously setting a degree appropriate to the shape of an imaging target object may be an embodiment of the present invention.

Since obtaining a directly from the expression 5 causes instability of the solution, stable solutions with several constraints are disclosed in the Document 2, the Document 3 and the Document 4. In the present embodiment, the solution can be realized by utilizing these techniques.

Further, it is necessary to appropriately select the degree n in correspondence with the complexity of the surface shape of the imaging target object to be represented. For example, a technique of adaptively obtaining the degree n with respect to the shape of an imaging target object is disclosed in Document 5. Further, previously setting a degree appropriate to the shape of an imaging target object may be an embodiment of the present invention.

By performing the above-described processing, a coefficient matrix a of the implicit polynomial is obtained, and the surface shape of the imaging target object in the three-dimensional image input in step S301 is modeled.

Note that the degree n depends on the accuracy of registration. The registration accuracy is higher with the degree n. On the other hand, the load on calculation processing is increased with the degree n.

In the present embodiment, the implicit polynomial is obtained for plural degrees n and selectively used.

In the initial stage of calculation, rough registration is performed for speeding up, and the degree n is low so as not to arrive at a solution called a local minimum. Then, as the number of calculations is increased, an expression where the degree n is high is used. The change of expression may be performed in correspondence with the value obtained by the calculation unit 1050 to be described later, or the degree in the selected polynomial may be changed in correspondence with a predetermined number of calculations.

That is, upon high-accuracy registration, the degree n is raised.

In the case of a medical image, imaging conditions are strongly correlated with image quality. For example, in X-ray imaging, the image quality is improved with the amount of X-ray. Accordingly, a high-degree n is required for a high-quality image. That is, it is preferable to determine the degree n based on imaging conditions.

In step S304, the second image input unit 1030 inputs the second image data obtained by the second imaging apparatus 1110. The input of the second image data may be directly input in synchronization with the imaging by the second imaging apparatus 1110. Otherwise, it may be arranged such that an image obtained by the second imaging apparatus 1110 in the past is stored in the image storage apparatus 3 in FIG. 2, and the image is read and input. In any case, the second image is an image of at least a part of the imaging target object in the two-dimensional image or the three-dimensional image input in step S301. Note that for the sake of simplification of explanation, the input image data is a two-dimensional tomographic image of the imaging target object.

In step S305, the acquisition unit 1040 detects contour points of the imaging target object from the second image input in step S304. The imaging target object means an area of interest corresponding to, for example in the case of a medical image, a portion such as a lung, a stomach, a heart, a head, or a hand. When the second image is a three-dimensional image, contour points of the surface of the imaging target object are detected.

The contour points are extracted by, for example, edge detection processing. The edge detection processing is detecting a position where a pixel value on the image greatly changes. For example, an edge can be obtained by calculation of pixel value spatial gradient or can be obtained by using a Laplacian filter, a Sobel filter, a cany operator, or the like.

FIGS. 6A to 6C schematically illustrate edge detection with respect to an image by calculation of spatial gradient. FIG. 6A shows the input second image. FIG. 6B shows an image having spatial gradient absolute values for the image in FIG. 6A. In FIG. 6B, a value in the vicinity of the contour of the imaging target object obtained in FIG. 6A is greater. By performing predetermined threshold processing on the edges obtained as above, edge-detected pixels are discriminated from non-edge pixels. Then, the image coordinates of the detected N points (point group) are stored as $X_{USi}=(X_{USi}, Y_{USi}, Z_{USi})^T$ (i is an identifier indicating the i-th point in the detected point group).

Note that as the second image in the present embodiment is a two-dimensional tomographic image, a coordinate value in the horizontal direction of the image is represented with x, a coordinate value in the vertical direction of the image, y, and a coordinate value in the thickness direction of the image, z=0.

In this case, the point group exists on the same plane in the three-dimensional space.

Note that it is desirable that when noise is included in the second image, a smoothing filter such as a Gaussian filter or a median filter is applied to the image prior to the above-described edge detection processing so as to reduce the noise. Further, it is desirable that when an area other than an imaging target object is included in an image area, an image area is limited as shown in FIG. 6C and processing is performed on the limited image area. For example, it is desirable that mask processing is performed on an image or mask processing is performed on the result of edge detection, and thereby edges derived from areas other than the imaging target object are removed as much as possible.

In this step, plural position coordinates on the surface shape of the second image can be obtained.

Next, the relation between plural position coordinates on the surface shape of the first image, $x_{3D}=(x_{3D},y_{3D},z_{3D})^T$ and plural position coordinates on the surface shape of the second image, $x_{US}=(x_{US},y_{US},z_{US})^T$ will be described. Since these position coordinates are based on different coordinate systems, in the respective images obtained by imaging, for example, the same subject, position coordinates of pixels indicating the same position of a human body are different. FIGS. 7A to 7D are explanatory views showing general registration between images obtained by imaging in different coordinate systems. FIG. 7A shows an image obtained by imaging an imaging target object with a coordinate system 610 as the second image in the present embodiment. FIG. 7B shows an image obtained by imaging the image target object with a coordinate system 611 different from the coordinate system 610 as the first image in the present embodiment. In this example, for the sake of convenience of explanation with the drawings, the three-dimensional image is represented as a two-dimensional plane. Further, FIG. 7C shows a composited image by simple composition on the assumption that the coordinate systems of the images in FIGS. 7A and 7B correspond with each other. Actually, as the coordinate system 610 and the coordinate system 611 are different, the contours of the imaging target subject are shifted in the composited image in FIG. 7C. On the other hand, FIG. 7D shows a composite image of the both images properly reflecting the relation between the coordinate system 610 and the coordinate system 611. The processing in steps S306 to S310 according to the present embodiment to be described below is obtaining correspondence between plural images obtained by imaging in different coordinate systems (registration processing). This processing is performed by the calculation unit 1050.

At this time, the relation between pixels $x_{3D}$ and $x_{US}$ indicating the same position in the first image and the second image is represented as follows.

$$x_{3D}=R_{3D \to US}x_{US}+t_{3D \to US} \qquad (6)$$

Note that $R_{3D \to US}$ is an orthonormal 3×3 rotation matrix, and $t_{3D \to US}$ is a translation vector in the respective axis directions. When the notation of the coordinate value is an extended vector $(x,y,z)^T$, the Expression 6 is rewritten as follows.

$$x_{3D}=T_{US \to 3D}x_{US} \qquad (7)$$

Note that $T_{US \to 3D}$ is a 4×4 matrix in the following expression.

$$T_{US \to 3D} = \begin{pmatrix} R_{US \to 3D} & t_{US \to 3D} \\ 0 & 1 \end{pmatrix} \qquad (8)$$

The registration processing in the present embodiment is determining a conversion matrix $T_{US \to 3D}$ as a coordinate conversion method for converting position coordinates of plural contour points on the surface of imaging target object in the second image.

That is, the conversion matrix $T_{US \to 3D}$ is determined such that the distance between the surface of the imaging target object in the first image obtained in step S303 and the plural position coordinates on the surface of the second image obtained in step S305 is as close as possible. The processing is performed by various methods. In the present embodiment, a solution is obtained by repetitive calculation to comparatively stably obtain the solution. That is, processing to sequentially update a conversion matrix estimation value $\tilde{T}_{US \to 3D}$ is repeated, to finally derive a value close to the true conversion matrix $T_{US \to 3D}$. As described above, the degree n of the polynomial used in correspondence with registration accuracy is changed in correspondence with the number of calculations. This enables high-accuracy registration, and reduces the number of calculations. Further, it is preferable that the method of changing the degree of polynomial is changed in correspondence with imaging apparatus and/or imaging condition.

In step S306, the calculation unit 1050 sets an initial value of the conversion matrix $\tilde{T}_{US \to 3D}$ sequentially updated by the repetitive calculation. In the present embodiment, an output signal from the position measuring sensor 6 is read as the result of measurement, and a conversion matrix obtained from the measurement value is set as the initial value of the conversion matrix $\tilde{T}_{US \to 3D}$. The obtained conversion matrix is different from the true conversion matrix in accordance with sensor error or degree of movement of the subject.

In this example, the number of plural position coordinates on the surface of the imaging target object in the second image detected in step S305 is N, and as the position coordinates of the i-th edge point, $x_{USi}=(x_{USi},y_{USi},z_{USi})^T$ holds. In step S307, the calculation unit 1050 converts the position coordinate value of this edge point to a value in a coordinate system based on the first image by the following calculation.

$$x_{3D_i} = \tilde{T}_{US \to 3D} x_{US_i} \qquad (9)$$

Note that the conversion matrix $\tilde{T}_{US \to 3D}$ indicates an estimation value of a conversion matrix from the coordinate system of the second image to the coordinate system of the first image. At first, the initial value set in step S306 is used as the value of the matrix $\tilde{T}_{US \to 3D}$, and in the progress of the repetitive calculation, a sequentially updated value is used.

In step S308, the calculation unit 1050 further inputs information on the surface of the imaging target object in the first image represented with the implicit polynomial, and updates the conversion matrix $\tilde{T}_{US \to 3D}$ such that the information and the respective edge points on the second image are closer to each other.

To perform the above processing, first, in step S307, regarding an edge point $x_{3D_i}$ on the second image projected in the coordinate system of the first image, the calculation unit 1050 calculates a temporary movement target coordinate value $x'_{3D_i}$ using a vector $g(x_{3D_i})$ calculated with the IP.

$$x_{3D_i}' = x_{3D_i} + g(x_{3D_i}) \qquad (10)$$

Note that the vector $g(x_{3D_i})$ is represented as follows.

$$g(x_{3D_i}) = -\text{dist}(x_{3D_i}) \frac{\nabla \Psi_{3D}^n(x_{3D_i})}{\|\nabla \Psi_{3D}^n(x_{3D_i})\|} \qquad (11)$$

Note that $\nabla$ indicates an operator to obtain the spatial gradient. Further, $\text{dist}(x_{3D_i})$ is an approximated distance between the edge point $x_{3D_i}$ and the surface of the imaging target object represented with the IP, $$\text{dist}(x_{3D_i}) = \frac{\Psi_{3D}^n(x_{3D_i})}{\|\nabla \Psi_{3D}^n(x_{3D_i})\|} \qquad (12)$$

Note that as $\Psi''_{3D}$ is an IP representing the shape model of the imaging target object, $\Psi'''_{3D}(x_{3D_i})$ represents the value of the distance map in the position coordinate $x_{3D_i}$.

Next, from the edge point $x_{3D_i}$ on the second image projected in the coordinate system of the first image and the edge point $x'_{3D_i}$ temporarily moved with the expression 10, a rigid body conversion parameter for approximating the movement with a least square estimation reference is obtained. For this purpose, first, regarding the edge points $x_{3D_i}$ and $x'_{3D_i}$, a matrix X and a matrix X' where i=0~N coordinate vectors are connected are generated as follows.

$$X = (x_{3D_1} - \bar{x}_{3D}, x_{3D_2} - \bar{x}_{3D}, \ldots x_{3D_N} - \bar{x}_{3D})^T \qquad (13)$$

$$X' = (x_{3D_1}' - \bar{x}_{3D}', x_{3D_2}' - \bar{x}_{3D}', \ldots x_{3D_N}' - \bar{x}_{3D}')^T \qquad (14)$$

Note that $\bar{x}_{3D_i}$ and $\bar{x}_{3D_i}'$ are respective mean values of $x_{3D_i}$ and $x_{3D_i}'$. Then, $$A = X'^T X \qquad (15)$$

is obtained, and singular value decomposition of this A, $A = USV^T$ is performed. Then, using the result, the rotation matrix R and the translation vector t are obtained as follows.

$$R = UV^T \qquad (16)$$

$$t = \bar{x}_{3D}' - \bar{x}_{3D} R \qquad (17)$$

Finally, the conversion matrix $\tilde{T}_{US \to 3D}$ for registration is updated. The updated conversion matrix $\tilde{T}_{US \to 3D}$ is calculated using the results of the Expressions 16 and 17 as follows.

$$\tilde{T}_{US \to 3D}' = \begin{pmatrix} R & t \\ 0 & 1 \end{pmatrix} \tilde{T}_{US \to 3D} \qquad (18)$$

In step S309, the determination unit 1060 evaluates the conversion matrix $\tilde{T}_{US \to 3D}$ updated in step S308. For this purpose, the determination unit 1060 calculates the distance dist between the result of projection of the point group obtained in step S305 in the coordinate system of the first image and the IP obtained in step S303. The calculation of the distance is approximately obtained as follows.

$$\text{dist}(x''_{3D_i}, \Psi_{3D}^n(x)) = \frac{\Psi_{3D}^n(x''_{3D_i})}{\|\Psi_{3D}^n(x''_{3D_i})\|} \qquad (19)$$

Note that $x_{3D_i}'' = \tilde{T}_{US \to 3D}' x_{US_i}$ holds. It is a position coordinate vector of the edge point on the second image projected in the coordinate system of the first image with the updated conversion matrix $\tilde{T}_{US \to 3D}'$ obtained in step S308.

In step S310, the determination unit 1060 further determines whether the registration processing in step S307 to step S309 is terminated or the processing is further repeated. The determination is performed by, for example, comparison between the total sum of the distances of the respective edge points obtained in step S309 and a predetermined threshold value. When it is determined as a result of the comparison that the total sum of the distances of the respective edge points is less than the threshold value, the registration processing is terminated, otherwise, the processing returns to step S307 to repeat the registration processing. Further, it may be arranged such that the completion of the registration processing is determined when the amount of decrement of the total sum of the distances of the respective edge points obtained in step S309 is less than a predetermined threshold value by the registration processing. As described above, in the present embodiment, the degree n of the polynomial is changed in accordance with the total sum of the distances of the respective edge points.

When it is determined in step S310 that the registration processing is not terminated, the processing returns to step S307 to continue the repetition of the registration processing. At this time, processing in step S307 and the subsequent steps is performed using the updated conversion matrix $\tilde{T}_{US \to 3D}'$ obtained in step S308.

In step S311, the coordinate conversion unit 1070 performs coordinate conversion of the second image based on the conversion matrix $\tilde{T}_{US \to 3D}'$ obtained by processing to step S310. Then an integrated display of the first image and the second image is produced. The integrated display is performed by various methods. For example, it may be arranged such that pixel values of the first image and the second image are added in a predetermined ratio and displayed.

Further, it may be arranged such that a partial area of the first image is replaced with a corresponding surface image of the second image area and an integrated display is produced.

Further, it may be arranged such that the first image and the coordinate-converted second image are arrayed in a produced display.

According to the registration processing apparatus 1000 in the above-described embodiment, high accuracy registration between plural images can be quickly performed. Further, as an imaging target object is modeled using an IP, access to a distance map on a memory is unnecessary. Accordingly, operations (the Expressions 11 and 12) for moving amount calculation can be very quickly performed. Further, collation with the distance map on the memory is unnecessary, and the degree of the polynomial can be changed. Accordingly, the registration accuracy can be improved without arriving at a solution called a local minimum.

Further, it may be arranged such that the conversion matrix from the coordinate system of a three-dimensional image to the coordinate system of a two-dimensional image is obtained. In such case, the processing in step S307 is moving and rotating the IP obtained in step S303. The movement and rotation of the IP can be realized by performing calculation processing on the coefficient matrix of the IP by the method disclosed in Document 6. G. Taubin and D. Cooper, "Symbolic and Numerical Computation for Artificial Intelligence, chapter 6," computational Mathematics and Applications, Academic Press, 1992.

Further, in the above embodiment, the initial value of the conversion matrix is set using the measurement value by the position measuring sensor 6, however, the present invention is not limited to this arrangement.

For example, it may be arranged such that the repetitive calculation is started by using, as the initial value of the conversion matrix, an appropriate value such as a unit matrix, without use of the measurement value by the position measuring sensor 6.

In such a case, there is a possibility that the difference between the true conversion matrix and the initial value is large and a local optimum value different from the true conversion matrix is obtained by the repetitive calculation, or a lot of time is required for convergence of the calculation.

To address such problems, it may be arranged such that the number of repetitive processings is counted, and when the count value is a predetermined value but does not satisfy the termination condition in step S310, an initial value different from the initial value set in step S306 is set again and the processing is performed again.

Further, it may be arranged such that the number of repetitive processings is not counted but plural initial values are set in step S306. The processing in step S307 and the subsequent steps is performed by each initial value, and a final result is derived from the obtained plural results.

Further, when the registration processing is continuously performed on plural ultrasonic images, the result of registration of an immediately prior ultrasonic image may be given as an initial value of the next processing. According to this method, when the imaging positions of continuous ultrasonic images are close to each other, as processing can be started from an initial value close to an optimum solution, the number of repetitive processings can be reduced, and efficiency in the processing can be expected.

Further, in the above-described embodiment, the contour points are extracted by edge detection and an IP is modeled for the contour points, however, the present invention is not limited to this arrangement.

For example, it may be arranged such that an area feature such as texture of an organ as an imaging target object is extracted from a three-dimensional image, and modeling of an implicit polynomial is performed such that the area is included in the implicit polynomial. In this case, the imaging target object is defined with the texture of the organ.

According to this method, even when there is no edge in the contour pixels of an imaging target object in a three-dimensional image or even when edge detection cannot be easily performed in the registration processing, the present invention can be applied.

Further, in step S308, the calculation unit 1050 calculates movement of the respective edge points based on the distance map of the IP in the second coordinate system and updates the conversion matrix, however, the present invention is not limited to this arrangement. For example, in the Expression 13, $g(x_{3Di})$ may be expressed as follows.

$$g(x_{3D_i}) = k \frac{\nabla \Psi_{3D}^n(x_{3D_i})}{\|\nabla \Psi_{3D}^n(x_{3D_i})\|} \qquad (20)$$

(k is a scalar constant)

That is, the edge point movement and the conversion matrix update, without direct use of the distance map of the IP (approximation of the distance) indicated with the Expression 14 but use of another value which can be calculated from the distance map of the IP, can be another embodiment of the present invention.

According to the present invention, an apparatus for registration between two different images, obtained by imaging with different imaging apparatuses, with high accuracy, can be provided.

Note that the case where the functionality of the above-mentioned embodiment is achieved by supplying a software program to a system or device and reading out and executing the supplied program code through a computer is included in the scope of the present invention. In this case, the program code itself, read out of a storage medium, realizes the functional processing of the above described embodiments, and a computer readable storage medium storing the program codes is also included within the scope of the present invention.

Also, the present invention is not limited to an arrangement in which the functional processing of the above described embodiments is realized by the computer reading out and executing the program codes. For example, the functions of the present embodiment may be realized, in addition to through the execution of a loaded program using a computer, through cooperation with an OS or the like running on the computer based on instructions of the program. In this case, the OS or the like performs part or all of the actual processing, and the functions of the above-described embodiment are realized by that processing.

Furthermore, part or all of the functionality of the aforementioned embodiment may be written into a memory provided in a function expansion board installed in the computer, a function expansion unit connected to the computer, or the like, into which the program read out from the storage medium is written. In this case, after the program has been written into the function expansion board or the function expansion unit, a CPU or the like included in the function expansion board or the function expansion unit performs part or all of the actual processing based on the instructions of the program.

When the present invention is applied to the above described storage medium, program codes corresponding to the above described flowcharts are stored.

It should be noted that the above described embodiments are mere example of an registration processing apparatus regarding the present invention, and the present invention is not limited those embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-126455, filed May 13, 2008, which is hereby incorporated by reference herein in its entirety.

What is claimed is:

1. A registration apparatus comprising:
a generation unit adapted to generate a polynomial to calculate a value corresponding to a distance from an area as a target for registration in a first image;
an acquisition unit adapted to acquire a plurality of position coordinates from an area as a target for registration in a second image;
a calculation unit adapted to respectively calculate a value corresponding to the distance from the area as the target for registration in the first image using the polynomial, for position coordinates obtained by coordinate conversion of the plurality of position coordinates;
a determination unit adapted to determine a coordinate conversion method for the plurality of position coordinates based on the values calculated by said calculation unit; and
a coordinate conversion unit adapted to coordinate-convert the position coordinates in the second image by the coordinate conversion method determined by said determination unit.

2. The apparatus according to claim 1, wherein said calculation unit changes a degree of the polynomial in correspondence with the number of calculations.

3. The apparatus according to claim 1, wherein said calculation unit determines a degree of the polynomial based on the values, respectively corresponding to the distance from the area as the target for registration in the first image, calculated using the polynomial, for the position coordinates obtained by coordinate conversion of the plurality of position coordinates.

4. The apparatus according to claim 1, wherein said generation unit determines a degree of the polynomial on an imaging condition for the first image.

5. The apparatus according to claim 1, wherein the polynomial generated by said generation unit is an implicit function indicating a value 0 with respect to position coordinates on an outer surface of the area as the target for registration in the first image.

6. The apparatus according to claim 1, wherein a target object in the first image and a target object in the second image are respectively formed with data obtained by imaging with any one of a simple X-ray machine, an X-ray computerized tomography machine, a magnetic resonance imaging machine, a nuclear medicine diagnostic system and a diagnostic ultrasound system.

7. The apparatus according to claim 1, further comprising a display unit adapted to superpose-display a target object in the first image and a target object in the second image coordinate-converted by said coordinate conversion unit.

8. The apparatus according to claim 1, wherein the second image is obtained by imaging by a diagnostic ultrasound system,
wherein said diagnostic ultrasound system has a position measuring sensor to measure position and attitude of an imaging probe used in imaging, and
wherein said coordinate conversion unit determines an initial value of the coordinate conversion method based on an output signal from said position measuring sensor.

9. The apparatus according to claim 1, wherein said acquisition unit acquires a plurality of position coordinates from an outer surface of the area as the target for registration in the second image.

10. A registration method comprising:
a generation step of generating a polynomial to calculate a value corresponding to a distance from an area as a target for registration in a first image;
an acquisition step of acquiring a plurality of position coordinates from an area as a target for registration in a second image;
a calculation step of respectively calculating a value corresponding to the distance from the area as the target for registration in the first image using the polynomial, for position coordinates obtained by coordinate conversion of the plurality of position coordinates;
a determination step of determining a coordinate conversion method for the plurality of position coordinates based on the values calculated in said calculation step; and
a coordinate conversion step of coordinate-converting the position coordinates in the second image by the coordinate conversion method determined in said determination step.

11. A non-transitory computer-readable storage medium holding a program for causing a computer to perform the registration method in claim 10.

12. An information processing apparatus for registration between a first area and a second area of an image, comprising:
a first acquisition unit adapted to obtain a polynomial to calculate a value corresponding to a distance from the first area as a target for registration to produce a distance map based on distance of each pixel to the first area; and
a second acquisition unit adapted to obtain a correction value for registration between the first area and the second area using position coordinates of the second area and the polynomial.

13. The apparatus according to claim 12, wherein said first acquisition unit changes a degree of the polynomial in correspondence with the number of calculations.

14. An information processing method for registration between a first area and a second area of an image, comprising:
a first acquisition step of obtaining a polynomial to calculate a value corresponding to a distance from the first area as a target for registration to produce a distance map based on distance of each pixel to the first area; and
a second acquisition step of obtaining a correction value for registration between the first area and the second area using position coordinates of the second area and the polynomial.

15. A non-transitory computer-readable storage medium holding a program for causing a computer to perform the registration method in claim 14.

* * * * *